(12) United States Patent
Amin et al.

(10) Patent No.: US 9,604,871 B2
(45) Date of Patent: Mar. 28, 2017

(54) DURABLE GLASS CERAMIC COVER GLASS FOR ELECTRONIC DEVICES

(71) Applicant: Corning Incorporated, Corning, NY (US)

(72) Inventors: Jaymin Amin, Corning, NY (US); George Halsey Beall, Big Flats, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 72 days.

(21) Appl. No.: 14/074,803

(22) Filed: Nov. 8, 2013

(65) Prior Publication Data

US 2014/0134397 A1    May 15, 2014

Related U.S. Application Data

(60) Provisional application No. 61/724,039, filed on Nov. 8, 2012.

(51) Int. Cl.
| | |
|---|---|
| *C03C 10/02* | (2006.01) |
| *C03C 10/04* | (2006.01) |
| *C03C 21/00* | (2006.01) |
| *C03C 3/093* | (2006.01) |
| *C03C 10/00* | (2006.01) |

(52) U.S. Cl.
CPC .......... *C03C 3/093* (2013.01); *C03C 10/0054* (2013.01); *C03C 21/002* (2013.01); *Y10T 428/24355* (2015.01); *Y10T 428/24975* (2015.01); *Y10T 428/265* (2015.01); *Y10T 428/315* (2015.01)

(58) Field of Classification Search
None
See application file for complete search history.

(56) References Cited

U.S. PATENT DOCUMENTS

| | | | |
|---|---|---|---|
| 3,673,049 A * | 6/1972 | Giffen et al. ................. 428/213 |
| 3,681,102 A | 8/1972 | Beall | |
| 4,059,428 A | 11/1977 | Andrews | |
| 4,341,543 A | 7/1982 | Andrus et al. | |
| 4,438,210 A * | 3/1984 | Rittler ............................... 501/4 |
| 4,455,160 A * | 6/1984 | Rittler ......................... 65/30.13 |
| 4,519,828 A | 5/1985 | Beall et al. | |
| 4,526,873 A | 7/1985 | Beall et al. | |
| 4,940,674 A * | 7/1990 | Beall et al. ......................... 501/4 |
| 5,070,045 A | 12/1991 | Comte et al. | |
| 5,127,931 A * | 7/1992 | Kiefer et al. ................. 65/30.13 |
| 5,786,286 A | 7/1998 | Kohli | |
| 5,968,219 A | 10/1999 | Gille et al. | |
| 5,968,857 A | 10/1999 | Pinckney | |
| 6,103,338 A | 8/2000 | Gille et al. | |
| 6,197,429 B1 | 3/2001 | Lapp et al. | |
| 6,248,678 B1 * | 6/2001 | Pinckney ............ C03C 10/0036 501/10 |
| 6,531,420 B1 | 3/2003 | Beall et al. | |
| 6,632,757 B2 | 10/2003 | Beall | |
| 6,632,758 B2 | 10/2003 | Beall et al. | |
| 6,660,669 B2 | 12/2003 | Beall et al. | |
| 6,844,278 B2 | 1/2005 | Wang et al. | |
| 7,105,232 B2 | 9/2006 | Striegler | |
| 7,300,896 B2 | 11/2007 | Zachau et al. | |
| 7,361,405 B2 | 4/2008 | Roemer-Scheuermann et al. | |
| 7,507,681 B2 | 3/2009 | Aitken et al. | |
| 7,730,531 B2 | 6/2010 | Walsh | |
| 7,763,832 B2 | 7/2010 | Striegler et al. | |
| 7,910,507 B2 | 3/2011 | Nishikawa et al. | |
| 8,143,179 B2 | 3/2012 | Aitken et al. | |
| 2007/0213192 A1 * | 9/2007 | Monique Comte et al. ..... 501/7 |
| 2007/0232476 A1 * | 10/2007 | Siebers et al. .................... 501/4 |
| 2007/0259767 A1 * | 11/2007 | Siebers et al. .................. 501/59 |
| 2007/0270299 A1 | 11/2007 | Rosenflanz et al. | |
| 2008/0199622 A1 | 8/2008 | Roemer-Scheuermann et al. | |
| 2009/0018007 A1 * | 1/2009 | Siebers et al. .................. 501/63 |
| 2010/0099546 A1 * | 4/2010 | Aitken et al. ..................... 501/4 |
| 2010/0130341 A1 * | 5/2010 | Wondraczek ...................... 501/4 |
| 2010/0167903 A1 * | 7/2010 | Comte et al. ................... 501/27 |
| 2011/0092353 A1 * | 4/2011 | Amin et al. ....................... 501/3 |
| 2012/0114955 A1 | 5/2012 | Almoric et al. | |
| 2012/0196109 A1 | 8/2012 | Marjanovic et al. | |
| 2013/0224493 A1 * | 8/2013 | Gabel et al. .................. 428/410 |
| 2014/0134397 A1 * | 5/2014 | Amin et al. ................... 428/141 |

OTHER PUBLICATIONS

Pinckney, "Glass-Ceramics", Kirk-Othmer Encyclopedia of Chemical Technology, 4th edition, vol. 12, John Wiley and Sons, 627-644, 1994.

* cited by examiner

*Primary Examiner* — David Sample
(74) *Attorney, Agent, or Firm* — Jason A. Barron; Robert P. Santandrea

(57) ABSTRACT

The invention relates to glass articles suitable for use as electronic device housing/cover glass which comprise a glass ceramic material. Particularly, a cover glass comprising an ion-exchanged glass ceramic exhibiting the following attributes (1) optical transparency, as defined by greater than 90% transmission at 400-750 nm; (2) a fracture toughness of greater than 0.6 MPa·m$^{1/2}$; (3) a 4-point bend strength of greater than 350 MPa; (4) a Vickers hardness of at least 450 kgf/mm$^2$ and a Vickers median/radial crack initiation threshold of at least 5 kgf; (5) a Young's Modulus ranging between about 50 to 100 GPa; (6) a thermal conductivity of less than 2.0 W/m° C., and (7) and at least one of the following attributes: (i) a compressive surface layer having a depth of layer (DOL) greater and a compressive stress greater than 400 MPa, or, (ii) a central tension of more than 20 MPa.

14 Claims, No Drawings

DURABLE GLASS CERAMIC COVER GLASS FOR ELECTRONIC DEVICES

CROSS-REFERENCE TO RELATED APPLICATIONS

This application claims the benefit of priority under 35 U.S.C. §119 of U.S. Provisional Application Ser. No. 61/724,039, filed on Nov. 8, 2012, the content of which is relied upon and incorporated herein by reference in its entirety.

TECHNICAL FIELD

The invention is directed to glass ceramic materials that can be used as cover glasses for electronic devices. In particular, the invention is directed to essentially colorless glass ceramics having high optical transmission in the visible region which are suitable for use as cover glass materials for electronic devices.

BACKGROUND

In the past decade portable electronic devices such as laptops, PDAs, media players, cellular phones, etc. (frequently referred to as "portable computing devices"), have become small, light and powerful. One factor contributing to the development and availability of these small devices is the manufacturer's ability to reduce of the device's electronic components to ever smaller and smaller sizes while simultaneously increasing both the power and or operating speed of such components. However, the trend to devices that are smaller, lighter and more powerful presents a continuing challenge regarding design of some components of the portable computing devices.

One particular challenge is associated with the design of the portable computing devices is the cover glass used as both the display screen and for protection of the sensitive optical components that provides visualization means for the devices. This design challenge generally arises from two conflicting design goals—the desirability of making the device lighter and thinner while continuing to make the display as large as possible, and the desirability of making the cover glass stronger and more scratch and fracture resistant. Thinner cover glasses tend to be more flexible, are more prone to breaking than thicker cover glasses. Unfortunately, the increased weight of the stronger, thicker glasses may lead to user dissatisfaction.

In view of the foregoing problems with existing cover glass materials, there is a need for improved cover glasses for portable computing devices. In particular, there is a need for cover glass materials that are more cost effective, lighter, and stronger than current designs.

SUMMARY

In one embodiment the invention relates to portable electronic devices capable of wireless communications having glass ceramic cover glasses.

A first aspect comprises an article suitable as a cover glass for a portable electronic device, the article comprising a glass ceramic exhibiting: a. optical transparency of greater than 60%, as defined by the transmission of light over the range of from 400-750 nm through 1 mm of the glass ceramic; b. colorlessness, as defined by having the values of L*≥90; 0.1≥a*≥−0.1; and 0.4≥b*≥−0.4 on the CIE 1976 Lab color space as measured in transmission through 1 mm of glass ceramic; c. at least one of the following attributes: (i) a fracture toughness of greater than 0.60 MPa·m$^{1/2}$; (ii) a 4-point bend strength of greater than 350 MPa; (iii) a Vickers hardness of at least 450 kgf/mm$^2$; (iv) a Vickers median/radial crack initiation threshold of at least 5 kgf; (v) a Young's Modulus ranging between 50 to 100 GPa; and (vi) a thermal conductivity of less than 2.0 W/m° C.; and d. at least one of the following attributes: (i) a compressive surface layer having a depth of layer (DOL) greater than or equal to 20 μm and a compressive stress greater than 400 MPa, or, (ii) a central tension of more than 20 MPa.

In some embodiments, the glass ceramic is ion exchanged. In some embodiments, the glass ceramic exhibits optical transparency of greater than 80%, as defined by the transmission of light over the range of from 400-750 nm through 1 mm of the glass ceramic. In some embodiments, the glass ceramic exhibits colorlessness, as defined by having color space coordinates of L*≥90; 0.08≥a*≥−0.08; and 0.3≥b*≥−0.3 on the CIE 1976 Lab color space as measured in transmission through 1 mm of glass ceramic. In some embodiments, the glass ceramic exhibits a Young's Modulus ranging between 50 and 75 GPa. In some embodiments, the glass ceramic exhibits an 4-point bend strength of greater than 475 MPa. In some embodiments, the glass ceramic exhibits a Vickers hardness of at least 500 kgf/mm$^2$ and Vickers median/radial crack initiation threshold of greater than 10 kgf. In some embodiments, the glass ceramic exhibits a thermal conductivity of less than 1.5 W/m° C. In some embodiments, the glass ceramic article is transparent and exhibits at least one surface having a Ra roughness of less than less than 50 nm. In some embodiments, the glass ceramic exhibits a near-infra-red transparency of greater than 80% at a wavelength ranging from 750 to 2000 nm. In some embodiments, the glass ceramic exhibits an overall thickness of 1.2 mm and compressive layer exhibiting a DOL of ranging between 40 to 80 μm and the compressive layer exhibits a compressive stress of 525 MPa. In some embodiments, the glass ceramic comprises a b-quartz, high alumina b-quartz, transparent b-spodumene, transparent spinel, transparent mullite. In some embodiments, the glass ceramic is fusion formable.

Another aspect comprises an article suitable as a cover glass for a portable electronic device, the article comprising a glass ceramic exhibiting: a. optical transparency of greater than 60%, as defined by the transmission of light over the range of from 400-750 nm through 1 mm of the glass ceramic; b. colorlessness, as defined by having the values of L*≥90; 0.1≥a*≥−0.1; and 0.4≥b*≥−0.4 on the CIE 1976 Lab color space as measured in transmission through 1 mm of glass ceramic; and c. at least one of the following attributes: (i) a fracture toughness of greater than 1.0 MPa·m$^{1/2}$; (ii) an MOR of greater than 135 MPa; (iii) a Knoop hardness of at least 400 kg/mm$^2$; (iv) a thermal conductivity of less than 4 W/m° C.; and (v) a porosity of less than 0.1%.

In some embodiments, the glass ceramic is ion exchanged. In some embodiments, the glass ceramic exhibits optical transparency of greater than 80%, as defined by the transmission of light over the range of from 400-750 nm through 1 mm of the glass ceramic. In some embodiments, the glass ceramic exhibits colorlessness, as defined by having color space coordinates of L*≥90; 0.08≥a*≥−0.08; and 0.3≥b*≥−0.3 on the CIE 1976 Lab color space as measured in transmission through 1 mm of glass ceramic. In some embodiments, the glass ceramic exhibits a Young's Modulus ranging between 50 and 75 GPa. In some embodiments, the glass ceramic exhibits an 4-point bend strength of greater than 475 MPa. In some embodiments, the glass ceramic exhibits a Vickers hardness of at least 500 kgf/mm² and Vickers median/radial crack initiation threshold of greater than 10 kgf. In some embodiments, the glass ceramic exhibits a thermal conductivity of less than 1.5 W/m° C. In some embodiments, the glass ceramic article is transparent and exhibits at least one surface having a Ra roughness of less than less than 50 nm. In some embodiments, the glass ceramic exhibits a near-infra-red transparency of greater than 80% at a wavelength ranging from 750 to 2000 nm. In some embodiments, the glass ceramic exhibits an overall thickness of 1.2 mm and compressive layer exhibiting a DOL of ranging between 40 to 80 µm and the compressive layer exhibits a compressive stress of 525 MPa. In some embodiments, the glass ceramic comprises a β-quartz, high alumina β-quartz, transparent β-spodumene, transparent spinel, transparent mullite. In some embodiments, the glass ceramic is fusion formable.

In certain embodiments the thickness of glass article housing/enclosure or cover is less than 2 mm and exhibits an aspect ratio greater than 25 to 1 (i.e., maximum dimension of length, width, or diameter which is >25 times greater than the thickness).

The ion exchanged glass article can be used in a variety of consumer electronic articles, for example, cellphones and other electronic devices capable of wireless communication, music players, notebook computers, PDA's, game controllers, computer "mice", electronic book readers and other devices.

DETAILED DESCRIPTION

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the invention, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the subgroup of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the claimed invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass composition of the present invention, certain impurities or components that are not intentionally added, can be present in the final glass composition. Such materials are present in the glass composition in minor amounts and are referred to herein as "tramp materials."

As used herein, a glass composition having 0 wt % of a compound is defined as meaning that the compound, molecule, or element was not purposefully added to the composition, but the composition may still comprise the compound, typically in tramp or trace amounts. Similarly, "sodium-free," "alkali-free," "potassium-free" or the like are defined to mean that the compound, molecule, or element was not purposefully added to the composition, but the composition may still comprise sodium, alkali, or potassium, but in approximately tramp or trace amounts.

As used herein the terms "display," "display screen" and "cover glass" are used interchangeably to describe the sheet-like material that covers the face of the electronic display on an electronic device. Use of "glass" in the term "cover glass" is meant to be inclusive of glass ceramics.

As used herein, "optical transparency" or "optically transparent" means that the material has the ability of allowing light in the visible region to pass through the material without being scattered. In some embodiments, optically transparent means that greater than 40, 45, 50, 55, 60, 65, 70, 75, 80, 85, 90, 95, 98, or 99% of the light in the visible range is passed through 1 mm thickness of the material without being scattered. In some embodiments, the "visible region" comprises from about 350 to about 800 nm. In some embodiments, the visible region comprises from about 390 to about 750 nm. In some embodiments, the lower limit of the visible region is about 350, 360, 370, 380, 390, 400, 410, 420, 430, 440, 450, or 460 nm. In some embodiments, the upper limit of the visible region is about 850, 840, 830, 820, 810, 800, 790, 780, 770, 760, 750, 740, 730, 720, 710, or 700 nm.

As used herein, "colorless" or "essentially colorless" means that the material has values of $L^* \geq 90$; $0.1 \leq a^* \leq -0.1$; and $0.4 \leq b^* \leq -0.4$ on the CIE 1976 Lab color space as measured in transmission through 1 mm of glass ceramic. In some embodiments, $L^*$ is $\geq 85$, $\geq 90$, $\geq 91$, $\geq 92$, $\geq 93$, $\geq 94$, $\geq 95$, $\geq 96$, $\geq 97$, $\geq 98$, or $\geq 90$. In some embodiments, $0.15 \geq a^* \geq -0.15$, $0.1 \geq a^* \geq -0.1$, $0.09 \geq a^* \geq -0.09$, $0.08 \geq a^* \geq -0.08$, $0.07 \geq a^* \geq -0.07$, $0.06 \geq a^* \geq -0.06$, $0.051 \geq a^* \geq -0.05$, $0.04 \geq a^* \geq -0.04$, $0.03 \geq a^* \geq -0.03$, or $0.02 \geq a^* \geq -0.02$. In some embodiments, $0.45 \geq b^* \geq -0.45$, $0.4 \geq b^* \geq -0.4$, $0.35 \geq b^* \geq -0.35$, $0.3 \geq b^* \geq -0.3$, $0.25 \geq b^* \geq -0.25$, $0.2 \geq b^* \geq -0.2$, $0.15 \geq b^* \geq -0.15$, $0.1 \geq b^* \geq -0.1$, $0.08 \geq b^* \geq -0.08$, $0.05 \geq b^* \geq -0.05$, or $0.03 \geq b^* \geq -0.03$. Colorless, as used herein, may include both intrinsically essentially colorless (because of the absence of ions or ion pairs, i.e. the presence of ions or ion pairs which when exposed to visible light can undergo electronic transitions) and essentially colorless due to compensating coloration by development of a complementary color in the material (see, e.g., U.S. Pat. No. 4,093,468, herein incorporated by reference in its entirety).

Regarding "colorless" or "essentially colorless" glass ceramics, though it appears the presence in a glass-ceramic of compounds imparting coloration could be avoided by avoiding or minimizing the introduction of said compounds or precursors thereof into the raw materials, the situation becomes more complex when certain necessary components can interact with a color-imparting species in the glass-ceramic material. For example, it is known that the presence of $Fe_2O_3$ alone (no $TiO_2$) up to contents of the order of 300 ppm in a glass-ceramic is generally not a concern as regards coloration. However, the joint presence of $Fe_2O_3$ and $TiO_2$ generates a characteristic yellowish tint. A number of commercial products which are otherwise known for their high transparency retain this yellowish tint, in particular those sold by the Applicant under the trade name KERALITE® (described in European patent application EP 0 437 228), those sold by Schott AG under the trade name ROBAX® and those sold by Nippon Electric Glass under the trade name NEOCERAM® N—O, because of the joint presence in their compositions of $TiO_2$ and $Fe_2O_3$. Treating the raw materials used to reduce the $Fe_2O_3$ content to below 150 ppm in particular is an expensive operation (an option mentioned in Japanese patent application JP 2001-348250) and it is seen above that $TiO_2$ is the best performing nucleating agent, allowing ceramming to occur on reasonable time scales. To overcome the technical problem mentioned above—obtaining transparent β-quartz glass-ceramic materials with no yellowish coloration—one possible approach seems to be to dispense with the presence of $TiO_2$ during manufacture.

"Glass ceramic" as used herein, describes any polycrystalline material produced through controlled crystallization of base glass. In some embodiments, glass-ceramics comprise from 30% to 90% [mol/mol] crystallinity. In some embodiments, the lower limit is about 20, 25, 30, 35, 40, 45, or 50% [mol/mol] crystallinity. In some embodiments, the upper limit is about 95, 90, 85, 80, 75, 70, or 65% [mol/mol] crystallinity.

As is described herein below, the needs of the industry for more cost effective, smaller, lighter, and stronger cover glass materials may be met by the use of durable glass ceramic compositions and articles as the cover glass for consumer electronics. Examples of devices which may utilize the improved glass ceramic cover glass materials include, but are not limited to, cell phones, electronic tablets, music players, notebook computers, game controllers, computer "mice", electronic book readers and other devices. These glass ceramic materials possess certain advantages such as weight and/or resistance to impact damage (e.g., denting) and scratching over the present materials, such as plastic and glass. Furthermore, the glass ceramics described herein are not only durable, but, unlike many of the materials presently used for housings/enclosures/covers, in particular metallic housing/enclosures, the use of glass ceramics does not interfere with wireless communications.

The glass ceramic material which is suitable for use in the cover glass of a portable electronic device may be formed from a variety of glass-ceramic materials. In particular, numerous glass-ceramic compositional families can be employed for this application. Glass ceramics based on b-quartz, high alumina b-quartz, transparent b-spodumene, transparent spinel, transparent mullite, exist and may be used in embodiments. Specific examples of glass ceramics that may be used in the present disclosure include, but are not limited to, those described in U.S. Pat. Nos. 3,681,102, 4,519,828, 7,730,531, 4,940,674, 4,341,543, 4,059,428, 4,526,873, 4,455,160, 7,507,681, 5,070,045, 6,103,338, 5,968,219, 6,197,429, 5,968,857, 5,786,286, 8,143,179, 6,844,278, 5,127,93, 6,248,678, 6,531,420, 6,632,757, 6,632,758, 6,660,669, 7,300,896, 7,910,507, 7,105,232, 7,361,405, 7,763,832, U.S. application Ser. No. 13/212,587, U.S. Publ. Nos. 2012/0114955, 2011/0092353, 2008/0199622, 2007/0270299, and PCT 2008/081728, all of which are incorporated by reference in their entireties. Additional glass ceramics for use in cover glass applications may be found in L. R. Pinckney, "*Glass-Ceramics*", Kirk-Othmer Encyclopedia of Chemical Technology, 4th edition, Vol. 12, John Wiley and Sons, 627-644, 1994, herein incorporated by reference in its entirety.

Examples of glass ceramics embodied herein may be found in Table 1 (from U.S. Pat. No. 3,681,102):

TABLE I

| | 1 | 2 | 3 | 4 | 5 | 6 | 7 |
|---|---|---|---|---|---|---|---|
| Percent: | | | | | | | |
| $SiO_2$ | 64.8 | 64.8 | 66.0 | 65.2 | 65.1 | 66.0 | 67.8 |
| $Al_2O_3$ | 18.5 | 15.7 | 16.0 | 17.2 | 17.2 | 16.0 | 17.0 |
| ZnO | 4.6 | 12.0 | 12.3 | 6.1 | 6.0 | 12.2 | 5.7 |
| MgO | 4.6 | — | — | 4.7 | 4.7 | — | 3.8 |
| $ZrO_2$ | 7.5 | 7.5 | 5.7 | 6.5 | 6.5 | 5.6 | 5.6 |
| $Cr_2O_3$ | — | — | — | 0.3 | 0.5 | 0.2 | 0.1 |
| Melting temp., °C. | 1,650 | 1,800 | 1,650 | 1,650 | 1,650 | 1,650 | 1,650 |

Table 2 (U.S. Pat. No. 4,519,828):

TABLE 2

| | 1 | 2 | 3 | 4 | 5 | 6 | 7 | 8 |
|---|---|---|---|---|---|---|---|---|
| $SiO_2$ | 45 | 40 | 45 | 45 | 60 | 45 | 50 | 40 |
| $B_2O_3$ | 15 | 15 | 20 | 15 | 15 | 30 | 15 | 25 |
| $Al_2O_3$ | 30 | 35 | 25 | 30 | 20 | 20 | 25 | 25 |
| $K_2O$ | 10 | 10 | 10 | — | 5 | 5 | 10 | 10 |
| $Na_2O$ | — | — | — | 10 | — | — | — | — |
| $Cr_2O_3$ | 0.05 | 0.05 | 0.05 | 0.05 | 0.05 | 0.05 | 0.05 | 0.05 |
| $As_2O_5$ | 0.05 | 0.05 | 0.05 | 0.05 | 0.05 | 0.05 | 0.05 | 0.05 |
| $Al_2O_3$:RO + $R_2O$ | 2.86 | 3.22 | 2.30 | 1.82 | 3.69 | 3.69 | 3.69 | 2.30 |

| | 9 | 10 | 11 | 12 | 13 | 14 | 15 | 16 |
|---|---|---|---|---|---|---|---|---|
| $SiO_2$ | 20 | 49 | 65 | 60 | 58 | 40 | 42.5 | 42.5 |
| $B_2O_3$ | 25 | 15 | 15 | 20 | 20 | 35 | 30 | 30 |
| $Al_2O_3$ | 35 | 30 | 15 | 15 | 20 | 20 | 20 | 20 |
| $K_2O$ | 20 | — | 5 | 5 | — | 5 | 7.5 | 7.5 |
| CaO | — | 6 | — | — | — | — | — | — |
| MgO | — | — | — | — | 2 | — | — | — |
| $Cr_2O_3$ | 0.05 | 0.05 | 0.05 | 0.05 | 0.05 | 0.05 | 0.10 | 0.30 |
| $As_2O_5$ | 0.05 | 0.05 | 0.05 | 0.05 | 0.05 | 0.05 | 0.05 | 0.05 |
| $Al_2O_3$:RO + $R_2O$ | 1.62 | 2.74 | 2.76 | 2.76 | 3.95 | 3.69 | 2.46 | 2.46 |

| | 17 | 18 | 19 | 20 | 21 | 22 | 23 | 24 |
|---|---|---|---|---|---|---|---|---|
| $SiO_2$ | 53.5 | 55 | 45 | 45 | 50 | 15 | 55 | 55 |
| $B_2O_3$ | 25 | 25 | 20 | 20 | 25 | 30 | 20 | 20 |
| $Al_2O_3$ | 20 | 20 | 25 | 25 | 20 | 25 | 20 | 20 |
| $K_2O$ | — | — | — | — | — | — | 5 | 5 |
| $Li_2O$ | 1.5 | — | — | — | — | — | — | — |
| BaO | — | — | 10 | — | — | — | — | — |
| SrO | — | — | — | 10 | 5 | — | — | — |
| PbO | — | — | — | — | — | 30 | — | — |
| $Cr_2O_3$ | 0.05 | 0.05 | 0.05 | 0.05 | 0.05 | 0.05 | 0.10 | 0.20 |
| $As_2O_5$ | 0.05 | 0.05 | 0.05 | 0.05 | 0.05 | 0.05 | 0.05 | 0.05 |
| $Al_2O_3$:RO + $R_2O$ | 3.93 | ∞ | 3.76 | 2.53 | 4.06 | 1.83 | 3.69 | 3.69 |

| | 25 | 26 | 27 | 28 | 29 | 30 | 31 | 32 |
|---|---|---|---|---|---|---|---|---|
| $SiO_2$ | 45 | 45 | 35 | 60 | 55 | 45 | 55 | 50 |
| $B_2O_3$ | 20 | 20 | 20 | 17.5 | 15 | 25 | 15 | 20 |
| $Al_2O_3$ | 25 | 25 | 20 | 20 | 25 | 20 | 20 | 20 |
| $K_2O$ | 10 | 10 | — | — | — | — | — | — |
| $Na_2O$ | — | — | — | 2.5 | — | — | — | — |
| $Cs_2O$ | — | — | 25 | — | — | — | — | — |
| MgO | — | — | — | — | 5 | — | — | — |
| BaO | — | — | — | — | — | 10 | 10 | — |
| SrO | — | — | — | — | — | — | — | 10 |
| $Cr_2O_3$ | 0.10 | 0.20 | 0.20 | 0.05 | 0.05 | 0.05 | 0.05 | 0.05 |
| $As_2O_5$ | 0.05 | 0.05 | 0.05 | 0.05 | 0.05 | 0.05 | 0.05 | 0.05 |

TABLE 2-continued

| $Al_2O_3$:RO + $R_2O$ | 2.30 | 2.30 | 2.21 | 3.04 | 1.98 | 3.01 | 3.01 | 2.03 |
|---|---|---|---|---|---|---|---|---|

| | 33 | 34 | 35 | 36 | 37 | 38 | 39 | 40 |
|---|---|---|---|---|---|---|---|---|
| $SiO_2$ | 57.5 | 40 | 60 | 60 | 59 | 59 | 65 | 65 |
| $B_2O_3$ | 20 | 22.5 | 20 | 25 | 6 | 20 | 17.5 | 10 |
| $Al_2O_3$ | 20 | 22.5 | 20 | 15 | 25 | 20 | 15 | 20 |
| $K_2O$ | 2.5 | — | — | — | 10 | — | — | — |
| PbO | — | 15 | — | — | — | — | — | — |
| $Na_2O$ | — | — | — | — | — | 1 | 2.5 | 5 |
| $Cr_2O_3$ | 0.05 | 0.05 | 0.05 | 0.05 | 0.05 | 0.05 | 0.05 | 0.05 |
| $As_2O_5$ | 0.05 | 0.5 | 0.5 | 0.5 | 0.5 | 0.5 | 0.5 | 0.5 |
| $Al_2O_3$:RO + $R_2O$ | 7.37 | 3.82 | ∞ | ∞ | 2.30 | 12.2 | 3.63 | 2.43 |

Table 3 (U.S. Pat. No. 4,526,873):

TABLE 3

| Oxide | 1 | 2 | 3 | 4 | 5 | 6 | 7 | 8 |
|---|---|---|---|---|---|---|---|---|
| $SiO_2$ | 50 | 45 | 52.5 | 53.5 | 48 | 48 | 44 | 44 |
| $B_2O_3$ | 0 | 15 | 17.5 | 15.0 | 24 | 20 | 17.5 | 17.5 |
| $Al_2O_3$ | 40 | 30 | 22.5 | 20.0 | 21 | 21 | 25.0 | 25.0 |
| BaO | 10 | — | — | — | — | — | — | — |
| $K_2O$ | 0 | 10 | — | 2.5 | 2 | 2 | 3.5 | 3.5 |
| $Na_2O$ | — | — | 2.5 | — | — | — | — | — |
| MgO | — | — | — | — | 3 | — | — | — |
| ZnO | — | — | 5.0 | 9.0 | 2 | 9 | 10.0 | 10.0 |
| $Cr_2O_3$ | 0.05 | 0.05 | 0.10 | 0.20 | 0.1 | 0.1 | 0.10 | 0.05 |
| $As_2O_{3.5}$ | — | — | — | — | — | — | — | 0.2 |
| $Al_2O_3$/RO + $R_2O$ | 6.0 | 2.86 | 2.16 | 1.43 | 1.71 | 1.56 | 1.53 | 1.53 |

Table 4 (U.S. Pat. No. 4,940,674):

TABLE 4

| | 1 | 2 | 3 | 4 | 5 | 6 | 7 |
|---|---|---|---|---|---|---|---|
| $SiO_2$ | 65.6 | 65.5 | 65.5 | 65.5 | 65.4 | 65.4 | 65.4 |
| $Al_2O_3$ | 19.9 | 19.9 | 19.9 | 19.9 | 19.8 | 19.7 | 19.7 |
| $B_2O_3$ | 2.3 | 2.3 | 2.3 | 2.3 | 2.3 | 2.0 | 1.9 |
| $Li_2O$ | 4.3 | 4.3 | 4.3 | 4.3 | 4.3 | 4.3 | 4.3 |
| $K_2O$ | 1.9 | 1.9 | 1.9 | 1.9 | 1.9 | 1.8 | 1.8 |
| BaO | 1.3 | 1.3 | 1.3 | 1.3 | 1.3 | 1.9 | 2.0 |
| $TiO_2$ | 2.5 | 2.5 | 2.5 | 2.5 | 2.5 | 2.5 | 2.5 |
| $ZrO_2$ | 1.2 | 1.2 | 1.2 | 1.2 | 1.2 | 1.2 | 1.2 |
| $Cr_2O_3$ | — | 0.007 | 0.015 | 0.025 | 0.014 | 0.006 | 0.008 |
| $Fe_2O_3$ | — | — | — | — | 0.11 | 0.085 | 0.040 |
| $Co_3O_4$ | — | — | — | — | 0.013 | 0.006 | 0.003 |
| $As_2O_3$ | 1.0 | 1.0 | 1.0 | 1.0 | 1.0 | 1.0 | 1.0 |

Table 5 (U.S. Pat. No. 5,968,857):

TABLE 5

| Glass-Ceramic Compositions and Properties | | | | | | | |
|---|---|---|---|---|---|---|---|
| Oxide | 1 | 2 | 3 | 4 | 5 | 6 | 7 |
| $SiO_2$ | 57.5 | 61.5 | 60.2 | 58.3 | 58.8 | 59.6 | 58.9 |
| $Al_2O_3$ | 22.5 | 18.4 | 18.4 | 20.2 | 20.4 | 18.4 | 20.4 |
| ZnO | 8.5 | 8.1 | 10.6 | 8.4 | 6.8 | 8.6 | 7.7 |
| MgO | 4.2 | 4.0 | 2.8 | 4.2 | 5.0 | 4.3 | 4.6 |
| $Cs_2O$ | — | — | — | — | — | — | — |
| BaO | — | — | — | — | — | — | — |
| $TiO_2$ | 7.3 | 3.0 | 3.0 | 3.0 | 3.0 | 3.0 | 3.2 |
| $ZrO_2$ | — | 5.0 | 5.0 | 5.0 | 5.0 | 5.0 | 5.3 |
| $NH_4NO_3$ | 1.0 | 1.0 | 1.0 | — | — | — | 1.0 |
| $As_2O_3$ | 0.5 | 0.5 | 0.5 | — | — | — | 0.5 |
| CaO | — | — | — | — | — | — | — |
| $\Sigma RO/Al_2O_3$ | 0.95 | 1.11 | 1.11 | 1.05 | 1.05 | 1.18 | 1.05 |
| H.T. | 800/1 900/2 | 800/1 900/2 | 800/1 875/2 | 800/1, 900/2 | 800/1, 900/2 | 800/1, 900/2 | 800/1, 900/2 |
| CTE($10^{-7}$/° C.) | 39.4 | 35.3 | 34.9 | 37.7 | 37.1 | 35.1 | 37.5 |
| Strain Point | 946 | 937 | 935 | 946 | 948 | 930 | 940 |
| Density | | | | 2.76 | | 2.72 | 2.76 |
| Liq. Temp. | | | | 1475 | 1495 | 1500 | |
| Liq. Visc. | | | | 350 | | | |
| T @ 300 poise | | | | 1490 | | | |
| T @ $10^3$ poise | | | | 1393 | | | |
| T @ $10^4$ poise | | | | 1257 | | | |
| T @ $10^5$ poise | | | | 1162 | | | |

| Oxide | 8 | 9 | 10 | 11 | 12 | 13 | 14 |
|---|---|---|---|---|---|---|---|
| $SiO_2$ | 58.9 | 57.0 | 55.7 | 57.7 | 55.0 | 53.6 | 56.5 |
| $Al_2O_3$ | 20.4 | 18.3 | 19.3 | 20.0 | 19.2 | 21.2 | 19.7 |
| ZnO | 7.7 | 8.4 | 9.0 | 8.5 | 13 | 11.3 | 9.7 |
| MgO | 4.6 | 2.0 | 2.0 | 3.5 | — | 2.0 | 2.0 |
| $Cs_2O$ | — | 4.1 | 4.0 | 2.1 | 2.0 | 2.0 | — |
| BaO | — | 2.0 | 2.0 | — | 3.1 | 2.0 | 4.6 |
| $TiO_2$ | 5.3 | 5.1 | 5.0 | 5.1 | 4.9 | 5.0 | 5.0 |

TABLE 5-continued

Glass-Ceramic Compositions and Properties

| | | | | | | | |
|---|---|---|---|---|---|---|---|
| $ZrO_2$ | 3.2 | 3.1 | 3.0 | 3.1 | 2.9 | 3.0 | 2.5 |
| $NH_4NO_3$ | 1.0 | — | — | — | — | — | 1.0 |
| $As_2O_3$ | 0.5 | — | — | — | — | — | 0.5 |
| $\Sigma RO/Al_2O_3$ | 1.05 | 1.0 | 1.0 | 1.0 | 1.0 | 1.0 | 1.0 |
| H.T. | 800/1 900/2 | 800/1 900/2 | 800/1 900/2 | 800/1 900/2 | 800/1 900/2 | 800/1 900/2 | 800/1 900/2 |
| CTE($10^{-7}$/° C.) | 38.3 | 37.1 | 39.1 | 37.5 | 38.9 | 40.3 | 39.1 |
| Strain Point | 943 | 891 | 905 | 948 | 915 | 928 | 868 |
| Density | 2.75 | | | | | | |
| Liq. Temp. | | | | 1435 | | 1475 | 1460 |
| Liq. Visc. | | | | 700 | | | |
| T @ 300 poise | | 1550 | 1530 | 1500 | 1500 | | |
| T @ $10^3$ poise | | 1443 | 1420 | 1420 | 1400 | | |
| T @ $10^4$ poise | | 1291 | 1280 | 1265 | 1260 | | |
| T @ $10^5$ poise | | 1180 | 1200 | 1190 | 1160 | | |

| Oxide | 15 | 16 | 17 | 18 | 19 | 20 |
|---|---|---|---|---|---|---|
| $SiO_2$ | 57.4 | 59.0 | 57.3 | 57.4 | 58.8 | 63.0 |
| $Al_2O_3$ | 18.5 | 19.1 | 18.5 | 17.7 | 20.0 | 17.8 |
| ZnO | 13.0 | 9.0 | 11.6 | 10.1 | 6.7 | 5.7 |
| MgO | — | 2.5 | 2.4 | — | 4.9 | 4.2 |
| $Cs_2O$ | — | — | — | — | — | — |
| BaO | 3.1 | 2.1 | 2.0 | 3.2 | 1.6 | 1.3 |
| $TiO_2$ | 5.0 | 5.1 | 5.0 | 5.1 | 5.0 | 5.0 |
| $ZrO_2$ | 3.0 | 3.1 | 3.0 | 3.1 | 3.0 | 3.0 |
| $NH_4NO_3$ | — | — | — | — | — | — |
| $As_2O_3$ | — | — | — | — | 0.5 | 0.5 |
| $La_2O_3$ | — | — | — | 3.4 | — | — |
| $\Sigma RO/Al_2O_3$ | 1.0 | 1.0 | 1.2 | 1.0 | — | — |
| H.T. | 800/1, 900/2 | 800/1, 900/2 | 800/1, 900/2 | 800/1, 900/2 | 800/1, 1000/2 | 800/1, 1000/2 |
| CTE($10^{-7}$/° C.) | 37.1 | 37.6 | 38.4 | 37.3 | 36.8 | 33.7 |
| Strain Point | 933 | 913 | 922 | 909 | 899 | 908 |
| Density | | 2.76 | | | 2.74 | 2.67 |
| Liq. Temp./° C. | | 1425 | | | 1360 | 1460 |
| Liq. Visc. | | 950 | | | | |
| T @ 300 poise | 1510 | 1520 | 1485 | 1530 | | |
| T @ $10^3$ poise | 1400 | 1416 | 1385 | 1425 | | |
| T @ $10^4$ poise | 1260 | 1275 | 1245 | 1280 | | |
| T @ $10^5$ poise | 1160 | 1180 | 1140 | 1170 | | |

Table 6 (U.S. Pat. No. 6,248,678):

TABLE 6

| wt % | 1 | 2 | 3 | 4 | 5 | 6 | 7 |
|---|---|---|---|---|---|---|---|
| $SiO_2$ | 64.8 | 63.4 | 66.3 | 67.0 | 65.8 | 68.7 | 70.7 |
| $Al_2O_3$ | 15.8 | 17.3 | 15.5 | 15.7 | 15.4 | 14.1 | 12.9 |
| ZnO | 7.5 | 6.4 | 5.8 | 3.9 | 7.0 | 5.2 | 4.8 |
| MgO | 2.1 | 3.2 | 2.8 | 3.9 | 2.2 | 2.6 | 2.4 |
| BaO | 1.7 | 1.7 | 1.6 | 1.6 | 1.6 | 1.4 | 1.3 |
| $TiO_2$ | 5.0 | 5.0 | 5.0 | 5.0 | 5.0 | 5.0 | 5.0 |
| $ZrO_2$ | 3.0 | 3.0 | 3.0 | 3.0 | 3.0 | 3.0 | 3.0 |
| $NH_4NO_3$ | 1.0 | 1.0 | 1.0 | 1.0 | 1.0 | 1.0 | 1.0 |
| $As_2O_5$ | 0.5 | 0.5 | 0.5 | 0.5 | 0.5 | 0.5 | 0.5 |
| H.T. | 800/1, 1000/2 | 800/1, 1000/2 | 800/1, 1000/2 | 800/1, 1000/2 | 800/1, 1000/2 | 800/1, 1000/2 | 800/1, 1000/2 |
| CTE($\times 10^{-7}$/° C.) | 31.3 | 32.7 | 30.2 | 30.4 | 30.9 | 28.3 | 27.3 |
| Strain pt ° C. | 910 | 903 | 924 | 898 | 907 | 902 | 908 |
| Anneal pt ° C. | 988 | 982 | 1000 | | | | 990 |
| Density (g/cm³) | | | 2.62 | 2.59 | 2.64 | 2.59 | 2.56 |
| Density: glass | | | | 2.55 | 2.59 | 2.54 | 2.52 |
| E-mod. ($10^6$ psi) | | | | 12.8 | 12.9 | 12.6 | |
| Liq. Temp ° C. | 1480 | 1450 | 1485 | 1485 | 1490 | 1490 | 1475 |
| Approx. Visc. At Liq. Temp. | | | | 1800 | 1500 | 2500 | |
| T ° C. @ $10^3$ p | | | | 1532 | 1518 | 1572 | |
| T ° C. @ $10^4$ p | | | | 1363 | 1353 | 1395 | |
| T ° C. @ $10^5$ p | | | | 1242 | 1235 | 1270 | |
| T ° C. @ $10^6$ p | | | | 1149 | 1146 | 1176 | |

TABLE 6-continued

| wt % | 8 | 9 | 10 | 11 | 12 | 13 | 14 |
|---|---|---|---|---|---|---|---|
| $SiO_2$ | 72.4 | 71.3 | 70.2 | 71.6 | 72.4 | 73.2 | 71.6 |
| $Al_2O_3$ | 11.9 | 13.0 | 12.8 | 12.7 | 11.9 | 13.0 | 12.7 |
| ZnO | 4.4 | 3.2 | 5.8 | 4.4 | 4.4 | 4.4 | 4.3 |
| MgO | 2.2 | 3.2 | 1.8 | 2.1 | 2.2 | 2.2 | 2.1 |
| BaO | 1.2 | 1.3 | 1.3 | 1.2 | 1.2 | 1.2 | — |
| $B_2O_3$ | — | — | — | — | 1.0 | — | — |
| $Cs_2O$ | — | — | — | — | — | — | 2.2 |
| $TiO_2$ | 5.0 | 5.0 | 5.0 | 5.0 | 5.0 | 4.0 | 5.0 |
| $ZrO_2$ | 3.0 | 3.0 | 3.0 | 3.0 | 3.0 | 2.0 | 2.0 |
| $NH_4NO_3$ | 1.0 | 1.0 | 1.0 | 1.0 | 1.0 | 1.0 | 1.0 |
| $As_2O_5$ | 0.5 | 0.5 | 0.5 | 0.5 | 0.5 | 0.5 | 0.5 |
| H.T. | 800/1, 1000/2 | 800/1, 1000/2 | 800/1, 1000/2 | 800/1, 1000/2 | 800/1, 1000/2 | 800/1, 1000/2 | 800/1, 1000/2 |
| CTE($\times 10^{-7}$/° C.) | 25.2 | 27.3 | 26.7 | 25.2 | 26.3 | 24.7 | 25.3 |
| Strain pt ° C. | 909 | 908 | 916 | 938 | 878 | 929 | 910 |
| Anneal pt ° C. | 991 | 988 | 997 | 1014 | | 1006 | 993 |
| Density (g/cm$^3$) | 2.54 | 2.54 | 2.57 | 2.54 | 2.53 | 2.52 | 2.54 |
| Density: glass | 2.50 | 2.50 | 2.53 | 2.50 | | 2.47 | 2.49 |
| Liq. Temp ° C. | 1485 | 1480 | 1475 | 1480 | | 1490 | 1440 |
| Approx. Visc. At Liq. Temp. | | | | 6500 | | | 15,500 |
| T ° C. @ $10^3$ p | | | | | | | |
| T ° C. @ $10^4$ p | | | | 1449 | | | 1470 |
| T ° C. @ $10^5$ p | | | | 1316 | | | 1327 |
| T ° C. @ $10^6$ p | | | | 1222 | | | 1217 |

Table 7 (U.S. Pat. No. 6,531,420):

TABLE 7

| | 1 | 2 | 3 | 4 | 5 | 6 | 7 | 8 |
|---|---|---|---|---|---|---|---|---|
| $SiO_2$ | 41.9 | 47.1 | 45.5 | 44.8 | 40.1 | 40.0 | 49.5 | 43.9 |
| $Al_2O_3$ | 11.7 | 14.0 | 14.0 | 14.0 | 11.3 | 12.0 | 14.5 | 11.7 |
| ZnO | 34.0 | 19.0 | 24.1 | 26.6 | 31.8 | 36.0 | | 26.6 |
| MgO | | | | | 4.5 | | 10.3 | 3.1 |
| $Li_2O$ | 1.7 | 7.0 | 3.5 | 1.7 | 1.7 | 2.5 | 7.6 | 4.0 |
| $K_2O$ | 10.7 | 12.9 | 12.9 | 12.9 | 10.6 | 9.5 | 13.3 | 10.7 |
| $Na_2O$ | | | | | | | | |
| $TiO_2$ | | | | | | | 4.8 | 2.7 |
| $ZrO_2$ | | | | | | | | |
| $P_2O_5$ | | | | | | | | |
| ° C.-hr | 750-2 | 750-2 | 750-2 | 750-2 | 750-2 | 750-2 | 750-2 | 750-2 |
| Glass-Ceramic Transparency | 4 | 2 | 2 | 3 | 4 | 4 | 2 | 2 |

| | 17 | 18 | 19 | 20 | 21 | 22 | 23 | 24 |
|---|---|---|---|---|---|---|---|---|
| $SiO_2$ | 45.5 | 52.3 | 49.0 | 53.6 | 54.4 | 61.3 | 67.2 | 65.3 |
| $Al_2O_3$ | 14.0 | 14.4 | 14.3 | 13.9 | 14.1 | 12.8 | 13.0 | 13.9 |
| ZnO | 23.5 | | | 17.2 | 16.8 | 13.9 | 9.1 | 9.7 |
| MgO | | 12.4 | 10.2 | | | | | |
| $Li_2O$ | 4.0 | 9.2 | 7.5 | 9.0 | 9.0 | 7.9 | 7.3 | 7.7 |
| $K_2O$ | 13.0 | 8.6 | 13.2 | | | | | |
| $Na_2O$ | | | 3.1 | | | | | |
| $TiO_2$ | | | 2.8 | | | | | |
| $ZrO_2$ | | | 2.8 | | | | | |
| $P_2O_5$ | | | | 6.4 | 5.7 | 4.1 | 3.4 | 3.4 |
| ° C.-hr | 650-1 | 725-2 | 725-1 | 650-2 750-4 | 650-2 700-4 | 650-2 700-4 | 650-2 700-4 | 650-2 700-4 |
| Glass-Ceramic Transparency | 3 | 2 | 4 | 1 | 3 | 4 | 4 | 2 |

| | 9 | 10 | 11 | 12 | 13 | 14 | 15 | 16 |
|---|---|---|---|---|---|---|---|---|
| $SiO_2$ | 51.6 | 48.2 | 49.0 | 50.0 | 43.0 | 46.3 | 42.1 | 53.4 |
| $Al_2O_3$ | 14.1 | 16.0 | 16.0 | 16.0 | 11.7 | 14.0 | 11.7 | 9.4 |
| ZnO | | 12.7 | 8.6 | 4.3 | 30.1 | 21.6 | 29.2 | 27.2 |
| MgO | 12.4 | | 3.0 | 6.0 | | | 4.0 | |
| $Li_2O$ | 9.2 | 5.8 | 6.1 | 6.4 | 4.4 | 5.2 | 2.3 | 1.4 |
| $K_2O$ | 12.9 | 14.6 | 14.6 | 14.6 | 10.8 | 12.9 | 10.7 | 8.6 |
| $Na_2O$ | | | | | | | | |
| $TiO_2$ | 2.7 | | | 2.7 | 2.7 | 2.7 | | |
| $ZrO_2$ | | | | | | | | |
| $P_2O_5$ | | | | | | | | |
| ° C.-hr | 750-2 | 600-1 | 600-1 | 600-1 | 650-1 | 650-1 | 650-1 | 650-1 |
| Glass-Ceramic Transparency | 2 | 4 | 4 | 3 | 2 | 2 | 2 | 3 |

TABLE 7-continued

|  | 25 | 26 | 27 | 28 | 29 | 30 | 31 | 32 |
|---|---|---|---|---|---|---|---|---|
| $SiO_2$ | 56.0 | 58.3 | 61.3 | 61.5 | 60.5 | 63.0 | 64.5 | 63.2 |
| $Al_2O_3$ |  | 1.6 | 12.8 | 7.8 | 7.7 | 8.0 | 8.2 | 8.0 |
| ZnO | 30.2 | 26.6 | 13.9 | 18.6 | 20.9 | 19.0 | 12.7 | 13.4 |
| MgO |  |  |  |  |  |  |  | 2.9 |
| $Li_2O$ | 10.3 | 9.5 | 7.9 | 8.0 | 6.9 | 9.2 | 10.9 | 8.2 |
| $K_2O$ |  |  |  |  |  |  |  |  |
| $Na_2O$ |  |  |  |  |  |  |  |  |
| $TiO_2$ |  |  |  |  |  |  |  |  |
| $ZrO_2$ |  |  |  |  |  |  |  |  |
| $P_2O_5$ | 3.5 | 4.0 | 4.1 | 4.1 | 4.0 | 3.8 | 2.8 | 4.3 |
| ° C.-hr | 575-2 | 575-2 | 650-2 | 700-2 | 600-2 | 600-2 | 600-4 | 600-2 |
|  | 650-4 | 700-4 | 700-4 | 750-4 | 750-4 | 750-4 | 650-4 |  |
| Glass-Ceramic Transparency | 1 | 2 | 3 | 2 | 4 | 4 | 4 | 3 |

Table 8 (U.S. Pat. No. 6,632,757):

TABLE 8

|  | 1 | 2 | 3 | 4 | 5 | 6 | 7 | 8 | 9 |
|---|---|---|---|---|---|---|---|---|---|
| $SiO_2$ | 50.4 | 50.1 | 50.4 | 51.5 | 37.6 | 51.3 | 48.7 | 48.1 | 45.6 |
| $GeO_2$ | — | — | — | — | 16.2 | — | — | — | — |
| $Al_2O_3$ | 14.7 | 14.0 | 14.7 | 15.0 | 13.7 | 16.4 | 17.7 | 14.0 | 18.7 |
| MgO | 21.4 | 22.9 | 21.4 | 21.9 | 19.9 | 17.2 | 17.2 | 25.0 | 18.4 |
| $K_2O$ | 13.5 | 13.0 | 13.5 | 10.5 | 12.6 | 15.1 | 16.4 | 12.9 | 17.3 |
| $Li_2O$ | — | — | — | 1.0 | — | — | — | — | — |
| $TiO_2$| | — | — | 4.0 | — | 3.7 | 5.0 | 5.0 | 5.0 | 4.9 |
| $Cr_2O_3$*| | 0.1 | — | 0.1 | — | 0.07 | 0.25 | 0.155 | 0.155 | 0.155 |
| $As_2O_5$| | 0.4 | — | — | — | — | — | — | — | — |
| Glass | green | clear | olive green | olive green | olive green | dark green | green, olive tint | green, olive tint | green, olive tint |
| Ceram. Cycle ° C.-hr | 750-4 850-2 | 750-4 900-2 | 750-2 900-4 | 750-2 850-4 | 750-2 900-4 | 750-2 900-4 | 750-8 900-2 | 750-4 900-1 | 750-4 900-1 |
| Glass-Ceramic | medium grained; translucent | medium grained; translucent | fine grained; translucent brownish | medium grained transparent | fine grained translucent brown | very fine grained; translucent green-brown | very fine grained; translucent green-brown | very fine grained; translucent green-brown | very fine grained; translucent green-brown |
| Crystal Phase | forsterite | forsterite | forsterite | forsterite | forsterite | forsterite | forsterite | forsterite | forsterite |

|excess of 100%
*total chromium oxide as $Cr_2O_3$

Table 9 (U.S. Pat. No. 6,632,758):

TABLE 9

|  | 1 | 2 | 3 | 4 | 5 | 6 | 7 | 8 |
|---|---|---|---|---|---|---|---|---|
| $SiO_2$ | 38.7 | 41.5 | 41.5 | 39.6 | 39.9 | 38.6 | 37.0 | 33.1 |
| $Ga_2O_3$ | 42.3 | 30.0 | 30.0 | 31.0 | 26.9 | 25.1 | 24.0 | 33.4 |
| $Al_2O_3$ | 7.7 | 16.3 | 16.3 | 15.9 | 18.9 | 16.2 | 15.5 | 14.0 |
| $Li_2O$ | 1.2 | 1.3 | 1.3 | 2.0 | 1.8 | — | — | — |
| $Na_2O$ | 10.0 | 10.8 | 10.8 | — | — | — | — | — |
| $K_2O$ |  |  |  | 11.5 | 12.5 | 15.1 | 14.5 | 12.9 |
| $La_2O_3$ |  |  |  |  |  | 4.0 | 8.0 | 5.3 |
| MgO |  |  |  |  |  | 1.0 | 1.0 | 1.3 |
| $TiO_2$ |  |  |  |  |  |  |  |  |
| NiO* | 0.5 | 0.5 |  | 0.5 | 0.1 | 0.1 | 0.1 | 0.1 |
| $Cr_2O_3$* |  |  | 0.5 |  |  |  |  |  |
| $As_2O_5$ |  |  |  |  | 0.6 |  |  |  |
| Glass Color | red-brown | red-brown | olive-green | red-brown | red-brown | red-brown | red-brown | light blue |
| Heat Treatment (° C./hr.) | 850°-2 | 775°-2 | 725°-2 775°-2 | 750°-8 900°-2 | 750°-8 900°-2 | 850°-2 | 900°-2 | 900°-2 |
| Glass-ceramic Color | blue-green | blue-green | yellow-olive | blue-green | blue-green | blue-green | blue | blue |
| Degree of Transparency | high | medium | medium | high | high | high | medium | medium |

TABLE 9-continued

| Crystal Phase | Alumino-gallate spinel | Alumino-gallate spinel | Alumino-gallate spinel | Alumino-gallate spinel | Alumino-gallate spinel | Alumino-gallate spinel | Alumino-gallate spinel | Alumino-gallate spinel |
|---|---|---|---|---|---|---|---|---|
| | 9 | 10 | 11 | 12 | 13 | 14 | 15 | 16 |
| $SiO_2$ | 27.5 | 38.6 | 37.3 | 43.5 | 39.4 | 37.5 | 35.7 | 41.3 |
| $Ga_2O_3$ | 42.3 | 25.1 | 30.6 | 28.5 | 30.2 | 31.0 | 29.5 | 22.8 |
| $Al_2O_3$ | 11.7 | 16.2 | 13.3 | 14.3 | 16.4 | 15.9 | 15.1 | 21.8 |
| $Li_2O$ | — | — | — | — | 1.0 | 1.0 | 1.0 | 2.1 |
| $Na_2O$ | — | — | — | — | — | — | — | — |
| $K_2O$ | 10.8 | 15.1 | 12.3 | 13.2 11.5 | 13.0 | 14.7 | 14.0 | 12.0 |
| $La_2O_3$ | 6.7 | 4.0 | 5.3 | — | — | — | — | — |
| MgO | 1.0 | 1.0 | 1.1 | 0.5 | — | — | — | — |
| $TiO_2$ | — | — | — | — | — | — | 4.8 | — |
| NiO* | 0.5 | — | 0.1 | 0.1 | 0.1 | — | — | 0.5 |
| $Cr_2O_3$* | — | 0.8 | — | — | — | — | — | — |
| $As_2O_5$ | — | — | — | — | — | 0.05 | 0.05 | — |
| Glass Color | blue-green | green | light blue | light blue | blue-green | color-less | color-less | red-brown |
| Heat Treatment (° C./hr.) | 850°-2 | 850°-2 | 900°-2 | 900°-2 | 700°-2 900°-2 | 750°-4 900°-2 | 750°-4 900°-2 | 750°-8 900°-2 |
| Glass-ceramic Color | blue-green | blue-green | yellow-olive | blue-green | blue-green | color-less | color-less | blue |
| Degree of Transparency | low | medium | medium | medium | medium | medium | low | high |
| Crystal Phase | Alumino-gallate spinel | Alumino-gallate spinel | Alumino-gallate spinel | Alumino-gallate spinel | Alumino-gallate spinel | Alumino-gallate spinel | | |
| | 20 | 21 | 22 | 23 | 24 | 25 | | |
| $SiO_2$ | 38.6 | 38.6 | 38.6 | 38.6 | 38.6 | 38.6 | | |
| $Ga_2O_3$ | 25.1 | 25.1 | 25.1 | 25.1 | 25.1 | 25.1 | | |
| $Al_2O_3$ | 16.2 | 16.2 | 16.2 | 16.2 | 16.2 | 16.2 | | |
| $K_2O$ | 15.1 | 15.1 | 15.1 | 15.1 | 15.1 | 15.1 | | |
| $La_2O_3$ | 4.0 | 4.0 | 4.0 | 4.0 | 4.0 | 4.0 | | |
| MgO | 1.0 | 1.0 | 1.0 | 1.0 | 1.0 | 1.0 | | |
| $Co_2O_3$* | 0.005 | 0.01 | 0.03 | 0.08 | 0.12 | 0.20 | | |
| Glass Color | Blue | Blue | Blue | Blue | | Blue | | |
| Heat Treatment (° C./hr.) | 900-2 | 900-2 | 900-2 | 900-2 | 900-2 | 900-2 | | |
| Glass-ceramic Color | Blue | Blue | Blue | Blue | Blue | Blue | | |
| Degree of Transparency | high | high | high | high | high | high | | |

*Transition metal oxide dopants in excess of 100%.

Table 10 (U.S. Pat. No. 6,660,669):

TABLE 10

Forsterite Glass-Ceramic Compositions

| | EXAMPLE NO. (wt %) | | | | | | | |
|---|---|---|---|---|---|---|---|---|
| OXIDES | Ex. 1 | Ex. 2 | Ex. 3 | Ex. 4 | Ex. 5 | Ex. 6 | Ex. 7 | Ex. 8 |
| $SiO_2$ | 47.6 | 47.4 | 48.8 | 47.9 | 51.1 | 44.1 | 47.9 | 46.2 |
| $Al_2O_3$ | 13.3 | 13.3 | 11.3 | 13.5 | 13.1 | 17.5 | 13.4 | 12.0 |
| MgO | 21.6 | 21.4 | 22.1 | 21.8 | 18.7 | 21.4 | 21.7 | 24.8 |
| $Na_2O$ | 8.2 | 5.4 | 7.0 | 4.1 | 7.9 | 10.6 | 4.1 | 7.3 |
| $K_2O$ | — | 4.1 | — | 6.2 | — | — | 6.2 | — |
| $TiO_2$ | 9.1 | 8.2 | 10.7 | 6.4 | 9.1 | 6.2 | 6.3 | 9.0 |
| $CrO_3$ | 0.2 | 0.2 | 0.2 | 0.2 | 0.2 | 0.2 | 0.4 | 0.6 |
| Glass Quality | Green, clear | Green, clear | Green, clear | Green, clear | Green, clear | Green, clear | Dark Green, clear | Very Dark Green |
| Heat Treatment Temp. (° C.) @ hrs. | 750 @ 8 850 @ 2 | 750 @ 8 850 @ 2 | 700 @ 8 850 @ 2 | 700 @ 8 850 @ 4 | 750 @ 8 850 @ 2 | 750 @ 8 900 @ 2 | 700 @ 8 850 @ 4 | 700 @ 8 850 @ 4 |
| Glass-Ceramic | Brown | Brown | Brown | Greenish | Olive | Brown | Greenish | Dark Brown |
| X-ray diffraction Crystal phase(s) | Forsterite, Minor rutile | Forsterite, Faint rutile | Forsterite, rutile | Forsterite | Forsterite, Minor enstatite | Forsterite, Cordierite, Cristobolite | Forsterite | Forsterite, Minor rutile |
| Liquidus (° C.) | 1450 | 1500 | — | 1500 | — | — | 1500 | — |

Table 11 (U.S. Publ. No. 2012/0114955):

TABLE 11

| | | |
|---|---|---|
| SiO$_2$ | | 45-65 |
| Al$_2$O$_3$ | | 14-28 |
| ZnO | | 4-13 |
| MgO | | 0-8 |
| with ZnO + MgO | | ≥8 |
| BaO | | 0-8 |
| SnO$_2$ | | 0.1-2 |
| TiO$_2$ | | 2-4 |
| ZrO$_2$ | | 3-4.5 |
| Fe$_2$O$_3$ | | <100 ppm. |

| Examples | A | B | C | D | 1 | 2 | 3 | 4 | 5 | 6 |
|---|---|---|---|---|---|---|---|---|---|---|
| Composition (wt %) | | | | | | | | | | |
| SiO$_2$ | 59.00 | 59.30 | 60.28 | 60.04 | 60.25 | 59.47 | 59.72 | 59.22 | 58.97 | 59.31 |
| Al$_2$O$_3$ | 19.00 | 19.10 | 19.41 | 19.33 | 19.40 | 19.13 | 19.23 | 19.23 | 18.97 | 19.10 |
| ZnO | 8.95 | 9.00 | 9.15 | 9.11 | 9.15 | 9.08 | 9.06 | 9.06 | 9.00 | 9.07 |
| MgO | 2.49 | 2.50 | 2.54 | 2.53 | 2.54 | 2.52 | 2.52 | 2.52 | 2.50 | 2.51 |
| BaO | 2.09 | 2.11 | 2.14 | 2.13 | 2.14 | 3.39 | 2.12 | 2.12 | 3.36 | 3.39 |
| TiO$_2$ | 4.97 | 5.00 | 3.43 | 3.42 | 2.35 | 2.30 | 2.33 | 2.33 | 2.28 | 3.40 |
| ZrO$_2$ | 2.98 | 2.99 | 3.05 | 3.04 | 3.95 | 3.87 | 3.92 | 3.92 | 3.84 | 3.02 |
| SnO$_2$ | 0.00 | 0.00 | 0.00 | 0.00 | 0.22 | 0.22 | 1.10 | 1.60 | 1.08 | 0.20 |
| As$_2$O$_3$ | 0.50 | 0.00 | 0.00 | 0.00 | 0.00 | 0.00 | 0.00 | 0.00 | 0.00 | 0.00 |
| SO$_3$ | | | | 0.4 | | | | | | |
| Fe$_2$O$_3$ (ppm) | 80 | 80 | 80 | 44 | 44 | 44 | 44 | 44 | 44 | 44 |
| (RO*/Al$_2$O$_3$) | 0.99 | 0.99 | 0.99 | 0.99 | 0.99 | 1.05 | 0.99 | 0.99 | 1.05 | 0.93 |
| Properties | | | | | | | | | | |
| Transmission | | | | | | | | | | |
| T at 400 nm % | 82.8 | 72.8 | 76.7 | 82.7 | 81.6 | 83 | 65.8 | 57.8 | 70.9 | 78.6 |
| T 80% (nm) | 395 | 739 | 500 | 373 | 395 | 387 | 432 | 445 | 426 | 407 |
| T 85% (nm) | 410 | 961 | 655 | 535 | 426 | 419 | 469 | 495 | 477 | 508 |
| T 90% (nm) | 744 | 1350 | 1116 | 1099 | 726 | 697 | 756 | 837 | 801 | 960 |
| Devitrification | | | | | | | | | | |
| Liquidus | 1421-1435° C. (940-1130 dPa · s) Mullite | | | | 1442-1460° C. (1000-1250 dPa · s) Zircon | 1430-1447° C. Zircon | 1449-1469° C. (1270-1620 dPa · s) Zircon | | 1445-1461° C. Zircon | 1430-1449° C. (970-1240 dPa · s) Mullite |
| Strain point | 925° C. | | | 955° C. | 935° C. | 894° C. | | | 890° C. | |
| CTE (10$^{-7}$ K$^{-1}$) | | | | | 36 | | | | | |

*RO = MgO + BaO + ZnO (mol %)

Additional aspects that influence glass ceramic suitability as a cover glass include, but not limited to, radio and microwave frequency transparency, 4-point bend strength, stiffness/Young's Modulus, hardness, crack indentation threshold, thermal conductivity, depth of compressive layer (DOL), surface compressive stress and central tension. Formability, finishing, design flexibility, and manufacturing costs associated with this glass ceramic material also factor into whether the particular glass ceramic material is suitable for use as the electronic device cover glass. Furthermore, the material selected may also depend on aesthetics including color, surface finish, weight, etc.

In one embodiment, the invention comprises a glass ceramic for use as an electronic device cover glass comprising an ion exchanged glass ceramic material exhibiting optical transparency in the visible spectrum, a fracture toughness of greater than 0.6 MPa·M$^{1/2}$, a 4-point bend strength of greater than 350 MPa, a Vickers hardness of at least 600 kgf/mm$^2$ and a Vickers median/radial crack initiation threshold of at least 5 kgf, a Young's Modulus ranging between about 50 to 100 GPa, a thermal conductivity of less than 2.0 W/m° C. In another embodiment, the glass ceramic exhibits a fracture toughness of greater than 1.0 MPa·m$^{1/2}$, an MOR of greater than 135 MPa, a Knoop hardness of at least 400 kg/mm$^2$, a thermal conductivity of less than 4 W/m° C. and a porosity of less than 0.1%. In a still further embodiment, the glass ceramic cover glass comprises a glass-ceramic which exhibits a fracture toughness of greater than 1.0 MPa·m$^{1/2}$, an MOR of greater than 275 MPa, preferably greater than 350 MPa. In a still further embodiment the electronic cover glass comprises a glass ceramic which exhibits a fracture toughness of greater than 0.70 MPa·m$^{1/2}$, and an 4-point bend strength of greater than 475 MPa, preferably greater than 525 MPa and a Young's Modulus/elasticity ranging between 50 and 75 GPa.

Fracture toughness in a preferred embodiment can be as high as 1.2 MPa·m$^{1/2}$. In some embodiments, the fracture toughness may be as high as 5.0 MPa·m$^{1/2}$.

In another aspect of the invention the glass-ceramic cover glass can be subject to an ion exchange process. At least one surface of the glass-ceramic article is subject to an ion exchange process, such that the one ion exchanged ("IX") surface exhibits a compressive layer having a depth of layer (DOL) greater than or equal to 2% of the overall article thickness and exhibiting a compressive strength of at least 300 MPa.

Any ion exchange process known to those in the art is suitable so long as the above DOL and compressive strength are achieved. See, e.g., U.S. Pat. No. 5,127,931, herein incorporated by reference. Such a process would include, but is not limited to submerging the glass ceramic article in a bath of molten Nitrate, Sulfate, and/or Chloride salts of Lithium, Sodium, Potassium and/or Cesium, or any mixture thereof. The bath and samples are held at a constant temperature above the melting temperature of the salt and below its decomposition temperature, typically between 350 and 800° C. The time required for ion-exchange of typical glass ceramics can range between 15 minutes and 48 hours, depending upon the diffusivity of the crystalline and glassy phases. In certain cases, more than one ion-exchange process may be used to generate a specific stress profile or surface compressive stress for a given glass ceramic material.

Additionally, in cases where the glass ceramic is ion exchanged, the glass ceramic cover glass may exhibit at least one of the following attributes: (i) a compressive surface layer having a depth of layer (DOL) greater than 20 μm and a compressive stress greater than 400 MPa, or, (ii) a central tension of more than 20 MPa. In an another exemplary embodiment the glass ceramic cover glass exhibits an overall thickness of 2 mm and compressive layer exhibiting a DOL of 40 μm with that compressive layer exhibiting a compressive stress of at least 525 MPa. Again, any ion exchange process which achieves these features is suitable.

In particular, the central tension CT within a glass ceramic article can be calculated from the compressive stress CS. Compressive stress CS is measured near the surface (i.e., within 100 μm), giving a maximum CS value and a measured depth of the compressive stress layer (also referred to herein as "depth of layer" or "DOL"). The relationship between CS and CT is given by the expression:

$$CT=(CS \cdot DOL)/(t-2\ DOL) \qquad (1),$$

wherein t is the thickness of the glass ceramic article. Unless otherwise specified, central tension CT and compressive stress CS are expressed herein in megaPascals (MPa), whereas thickness t and depth of layer DOL are expressed in millimeters.

It should be noted that in addition to single step ion exchange processes, multiple ion exchange procedures can be utilized to create a designed ion exchanged profile for enhanced performance. That is, a stress profile created to a selected depth by using ion exchange baths of differing concentration of ions or by using multiple baths using different ion species having different ionic radii. Additionally one or more heat treatments can be utilized before or after ion exchange to tailor the stress profile.

This requisite fracture toughness in excess of 0.6 MPa·m$^{1/2}$, in combination with 20 μm/surface compressive stress exceeding 400 MPa combination (or CT exceeding 20 MPa), the Vickers hardness/indentation threshold requirements, and the 4-point bend strength of greater than 350 MPa, all function to result in an cover glass which is sufficiently strong and durable so as to withstand typical consumer use/applications. One measure of this durability feature which the aforementioned ion-exchanged glass ceramic article is capable of meeting is the ability of the ion exchanged glass ceramic article to withstand a standard drop testing requirement involving numerous (e.g., 5) impacts/drops from a height of one meter onto a hard surface such as concrete or granite.

Referring now particularly to the thermal conductivity attribute, it should be noted that thermal conductivities of the desired level, particularly of less than 4 W/m° C., are likely to result in a cover glass that remains cool to the touch even in high temperatures approaching as high as 100° C. Preferably, a thermal conductivity of less than 3 W/m° C., and less than 2 W/m° C. are desired. Representative thermal conductivities* (in W/m° C.) for some suitable silicate glass-ceramics (discussed in detail below) include the following:

| | |
|---|---|
| Cordierite glass-ceramic | 3.6 |
| β-spodumene (Corningware) | 2.2 |
| β-quartz (Zerodur) | 1.6 |
| Wollastonite (Example 9 - below) | 1.4 |
| Machinable mica (Macor) | 1.3 |

*(see A. McHale, Engineering properties of glass-ceramics, in Engineered Materials Handbook, Vol. 4, Ceramics and Glasses, ASM International 1991, hereby incorporated by reference in its entirety.)

Other glass-ceramics which exhibit the requisite thermal conductivity feature included lithium disilicate based and canasite glass ceramics both of which are expected to exhibit thermal conductivity value of less than 4.0 W/m° C. For comparison, it should be noted that a ceramic such as alumina may exhibit undesirable thermal conductivities as high as 29.

In another exemplary embodiment the article, particularly the glass ceramic cover glass exhibits radio and microwave frequency transparency, as defined by a loss tangent of less than 0.015 over the frequency range of between 500 MHz to 3.0 GHz. This radio and microwave frequency transparency feature is especially important for wireless hand held devices that include antennas internal to the device. This radio and microwave transparency allows the wireless signals to pass through the cover glass and in some cases enhances these transmissions. Furthermore, it may also be desirable to be transparent in the infrared to allow wireless optical communication between electronic devices; specifically an infra-red transparency of greater than 80% at wavelengths ranging from 750 to 2000 nm. For example IR communication can be used to download music files to a portable music player, or workout data can be uploaded from a GPS or heart rate monitor to a computer for analysis.

In certain embodiments the glass ceramic cover glass has at least one surface exhibiting a Ra roughness of less than 50 nm, preferably less than 15 nm. In order to achieve this level of surface roughness, one option is to polish the surface using standard polishing techniques so as to achieve the requisite surface roughness of less than 50 nm, preferably less than 15 nm. Alternatively, the glass ceramic article can formed using a mold having a polished or non-textured surface so as to achieve the requisite surface roughness of less than 50 nm, preferably less than 15 nm.

One specific glass ceramic is the β-quartz solid solution shown in Table 12:

TABLE 12

| | |
|---|---|
| $SiO_2$ | 65.3 (wt %) |
| $Al_2O_3$ | 20.1 (wt %) |
| $B_2O_3$ | 2.0 (wt %) |
| $Li_2O$ | 3.6 (wt %) |
| $Na_2O$ | 0.3 (wt %) |
| $K_2O$ | |
| MgO | 1.8 (wt %) |
| $MgF_2$ | |
| CaO | |
| $CaF_2$ | |
| SrO | |
| BaO | |
| ZnO | 2.2 |
| $P_2O_5$ | |
| $TiO_2$ | 4.4 |
| $ZrO_2$ | |
| $SnO_2$ | 0.3 |
| Crystal | (1) |

TABLE 12-continued

| | |
|---|---|
| Strain (° C.) | 792 |
| Anneal (° C.) | 876 |
| CTE (×10–7/° C.) 25-300° C. | |
| Density (g/cm³) | 2.525 |
| Liq. Temp | 1210 |
| Liq. Visc (Poise) | 18000 |
| RoR Strength (MPa) | 350 |
| IX RoR Strength (MPa) | 700 |
| Fract Tough (MPa m$^{1/2}$) | 1 |
| Modulus (Mpsi) | 12.448 |
| Shear Mod (Mpsi) | 5.001 |
| P Ratio | 0.245 |

Generally, the process for forming any of the representative glass-ceramic materials detailed herein comprises melting a batch for a glass consisting essentially, in weight percent on the oxide basis as calculated from the batch, of a composition within the range set forth above. It is within the level of skill for those skilled in the glass-ceramic art to select the required raw materials necessary as to achieve the desired composition. Once the batch materials are sufficiently mixed and melted, the process involves cooling the melt at least below the transformation range thereof and shaping a glass article therefrom, and thereafter heat treating this glass article at temperatures between about 650-1,200° C. for a sufficient length of time to obtain the desired crystallization in situ. The transformation range has been defined as that range of temperatures over which a liquid melt is deemed to have been transformed into an amorphous solid, commonly being considered as being between the strain point and the annealing point of the glass.

The glass batch selected for treatment may comprise essentially any constituents, whether oxides or other compounds, which upon melting to form a glass will produce a composition within the aforementioned range. Fluorine may be incorporated into the batch using any of the well-known fluoride compounds employed for the purpose in the prior art which are compatible with the compositions herein describe Heat treatments which are suitable for transforming the glasses of the invention into predominantly crystalline glass-ceramics generally comprise the initial step of heating the glass article to a temperature within the nucleating range of about 600-850° C. and maintaining it in that range for a time sufficient to form numerous crystal nuclei throughout the glass. This usually requires between about ¼ and 10 hours. Subsequently, the article is heated to a temperature in the crystallization range of from about 800-1,200° C. and maintained in that range for a time sufficient to obtain the desired degree of crystallization, this time usually ranging from about 1 to 100 hours. Inasmuch as nucleation and crystallization in situ are processes which are both time and temperature dependent, it will readily be understood that at temperatures approaching the hotter extreme of the crystallization and nucleation ranges, brief dwell periods only will be necessitated, whereas at temperatures in the cooler extremes of these ranges, long dwell periods will be required to obtain maximum nucleation and/or crystallization.

Additionally, the heat treatment can be optimized to produce glass ceramics with high transmission properties. Such procedures are described in U.S. Publ. No. 2007/0270299, herein incorporated by reference in its entirety.

It will be appreciated that numerous modifications in the crystallization process are possible. For example, when the original batch melt is quenched below the transformation range thereof and shaped into a glass article, this article may subsequently be cooled to room temperature to permit visual inspection of the glass prior to initiating heat treatment. It may also be annealed at temperatures between about 550-650° C. if desired. However, where speed in production and fuel economies are sought, the batch melt can simply be cooled to a glass article at some temperature just below the transformation range and the crystallization treatment begun immediately thereafter.

Glass-ceramics may also be prepared by crystallizing glass fits in what is referred to as powder processing methods. A glass is reduced to a powder state, typically mixed with a binder, formed to a desired shape, and fired and crystallized to a glass-ceramic state. In this process, the relict surfaces of the glass grains serve as nucleating sites for the crystal phases. The glass composition, particle size, and processing conditions are chosen such that the glass undergoes viscous sintering to maximum density just before the crystallization process is completed. Shape forming methods may include but are not limited to extrusion, pressing, and slip casting.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. An article suitable as a cover glass for a portable electronic device, the article comprising a glass ceramic, the glass ceramic having a primary crystalline phase of transparent spinel or transparent mullite and exhibiting:
    a. optical transparency of greater than 60%, as defined by the transmission of light over the range of from 400-750 nm through 1 mm of the glass ceramic;
    b. colorlessness, as defined by having the values of L*≥90; 0.1≥a*≥−0.1; and 0.4≥b*≥−0.4 on the CIE 1976 Lab color space as measured in transmission through 1 mm of glass ceramic;
    c. at least one of the following attributes:
        (i) a fracture toughness of greater than 0.60 MPa·m$^{1/2}$;
        (ii) a 4-point bend strength of greater than 350 MPa;
        (iii) a Vickers hardness of at least 450 kgf/mm²;
        (iv) a Vickers median/radial crack initiation threshold of at least 5 kgf;
        (v) a Young's Modulus ranging between 50 to 100 GPa; and
        (vi) a thermal conductivity of less than 2.0 W/m° C.; and
    d. at least one of the following attributes:
        (i) a compressive surface layer having a depth of layer (DOL) greater than or equal to 20 μm and a compressive stress greater than 400 MPa, or,
        (ii) a central tension of more than 20 MPa.

2. The article of claim 1 wherein the glass ceramic exhibits optical transparency of greater than 80%, as defined by the transmission of light over the range of from 400-750 nm through 1 mm of the glass ceramic.

3. The article of claim 1, wherein the glass ceramic exhibits colorlessness, as defined by having color space coordinates of L*≥90; 0.08≥a*≥−0.08; and 0.3≥b*≥−0.3 on the CIE 1976 Lab color space as measured in transmission through 1 mm of glass ceramic.

4. The article of claim 1, wherein the glass ceramic is ion exchanged.

5. The article of claim 4, wherein the glass ceramic exhibits an overall thickness of 1.2 mm and compressive layer exhibiting a DOL of ranging between 40 to 80 μm and the compressive layer exhibits a compressive stress of 525 MPa.

6. The article claimed in claim 1 wherein the glass ceramic exhibits a Young's Modulus ranging between 50 and 75 GPa.

7. The article claimed in claim 1 wherein the glass ceramic exhibits an 4-point bend strength of greater than 475 MPa.

8. The article claimed in claim 1 wherein the glass ceramic exhibits a Vickers hardness of at least 500 kgf/mm$^2$ and Vickers median/radial crack initiation threshold of greater than 10 kgf.

9. The article of claim 1, wherein the glass ceramic exhibits a thermal conductivity of less than 1.5 W/m° C.

10. The article of claim 1, wherein the glass ceramic is transparent and exhibits at least one surface having a Ra roughness of less than less than 50 nm.

11. The article of claim 1, wherein the glass ceramic exhibits a near-infra-red transparency of greater than 80% at a wavelength ranging from 750 to 2000 nm.

12. The article of claim 1, wherein the glass ceramic is fusion formable.

13. An article suitable as a cover glass for a portable electronic device, the article comprising a glass ceramic, the glass ceramic having a primary crystalline phase of transparent spinel or transparent mullite and exhibiting:
   a. optical transparency of greater than 60%, as defined by the transmission of light over the range of from 400-750 nm through 1 mm of the glass ceramic;
   b. colorlessness, as defined by having the values of $L^*\geq 90$; $0.1\geq a^*\geq -0.1$; and $0.4\geq b^*\geq -0.4$ on the CIE 1976 Lab color space as measured in transmission through 1 mm of glass ceramic; and
   c. at least one of the following attributes:
      (i) a fracture toughness of greater than 1.0 MPa·m$^{1/2}$;
      (ii) an MOR of greater than 135 MPa
      (iii) a Knoop hardness of at least 400 kg/mm$^2$;
      (iv) a thermal conductivity of less than 4 W/m° C.; and
      (v) a porosity of less than 0.1%.

14. An electronic device comprising the article of any of claims 11 and 12.

* * * * *